Jan. 12, 1960

H. BOLDT ET AL 2,920,673

RESILIENT VEHICLE WHEEL

Filed Oct. 20, 1955

Inventors
HELLMUTH BOLDT
WALTER VOIGT by Attys.

United States Patent Office 2,920,673
Patented Jan. 12, 1960

2,920,673
RESILIENT VEHICLE WHEEL

Hellmuth Boldt and Walter Voigt, Burscheid, near Koln, Germany, assignors, by mesne assignments, to Rand-Goetze Corporation, Cleveland, Ohio, a corporation of Ohio Application October 20, 1955, Serial No. 541,688

Claims priority, application Germany October 28, 1954

3 Claims. (Cl. 152—47)

This invention relates to vehicle wheels, and more particularly to non-rigid vehicle wheels employing an elastic or resilient mounting of a tire on a wheel rim.

It is an object of our invention to provide a new and improved vehicle wheel having novel means for resiliently supporting the tire from the rim.

A further object of our invention is to provide a non-rigid wheel construction in which lateral stability is achieved without the use of sliding and supporting disks.

A further object is to provide a non-rigid wheel of economical and simplified construction having novel means providing desirable characteristics of shock-absorption.

These and other objects, features, and advantages of the present invention will be readily apparent from the following description of certain preferred embodiments thereof, taken in conjunction with the accompanying drawing, in which.

As shown by the drawings, we have devised a novel vehicle wheel structure in which a tire 10 is non-rigidly mounted on a rim 12 of a central web or supporting disk 14 of a wheel. Alternative preferred constructions for obtaining that desired non-rigid mounting are illustrated by the several views.

According to the present invention, the tire 10 is supported from the wheel rim 12 through the medium of a pair of ring-like tire-carrying members such as the resilient rings 16, 18. The rings 16, 18 are formed from resilient, flexible material, preferably of rubber or like material. As shown, the rings 16, 18 are molded or formed integrally with the tire 10, those rings 16, 18 projecting from opposite sides of the tire 10 and each extending both axially outward of the tire and radially inward thereof in the general form of a truncated cone. In cross-section the rings 16, 18 may possess the general thickened hourglass configuration, as shown. The tire 10 is wholly supported by the rings 16, 18, they being adapted to flex to permit relative movement of the tire and rim. It should be noted that the rings 16, 18 extend from the tire sidewalls from points spaced radially outward from the inner portion of the tire but adjacent the inner diameter of said tire, thereby effecting a lateral control and lateral stability without the use of sliding or supporting disks and the like.

Figure 1:
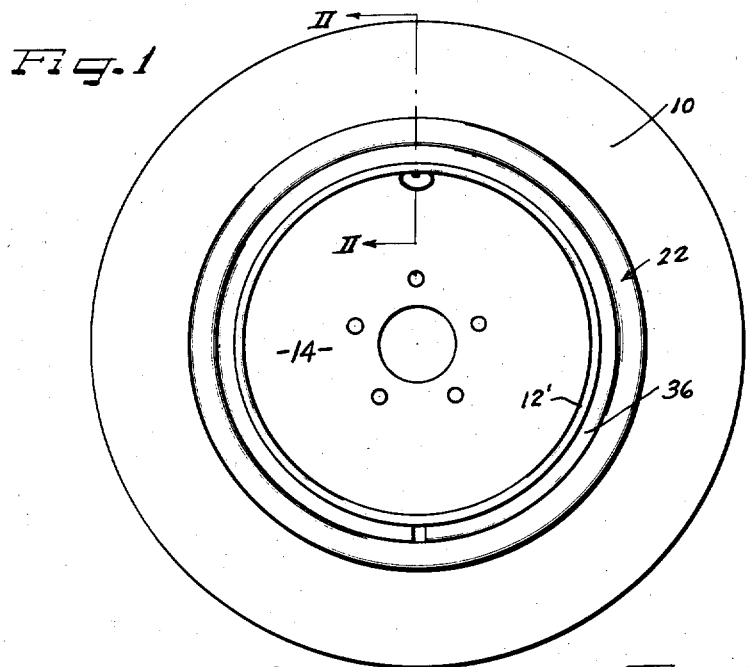
Figure 1 is a side elevational view of a wheel structure embodying our invention in one preferred embodiment.
Figure 2:
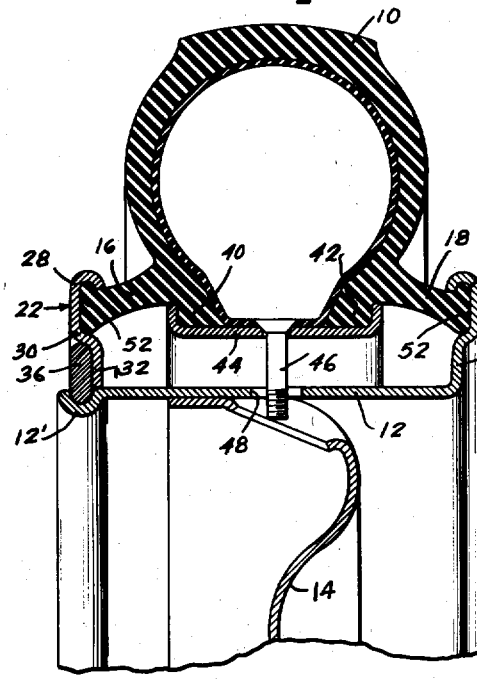
Figure 2 is a cross-sectional view taken axially through the device of Fig. 1, and taken generally along the line II—II of Fig. 1.

Fig. 2 indicates a preferred construction in which the rings 16, 18 are mounted on the rim 12 by clamping them between a pair of retaining means spaced axially along the rim 12 and identified generally by reference numerals 20 and 22. As shown, the retaining means 20 desirably is formed integrally as an extension of the rim 12, and is provided by first turning an end portion of the rim 12 outwardly to provide a spacing web 24, then axially outwardly, radially outwardly, and axially inwardly to provide an axially inwardly-opening annular recess 26 into which is fitted the end of the resilient ring 18 removed from the tire 10.

The retaining means 22 includes a retainer ring 30 which is desirably of the same configuration as the flange 20 just described. Thus the retainer ring 30 has an outwardly extending annular web 32 the outer end of which is turned axially outward, then radially outward, then axially inward to provide the annular recess 28. The inner diameter of the web 32 of the retainer ring 30 is large enough that it may be slipped along the rim 12 past a groove 12' pressed therein, with the ring-recess 28 disposed outward of the rim-recess 12'. A lock ring, such as a C-ring 36, is adapted to seat in the rim-recess 12' to abut the ring-web 32 to hold the ring 30 against axially outward movement.

In the assembly of a wheel embodying the construction just described, beads 40, 42 of the tire 10 are first secured together, such as by a clamp ring or band 44 of a general U-shape in cross-section as shown, the band 44 being desirably of steel and serving not only to hold the beads 40, 42 but also to distribute stress circumferentially along the tire when the tire is in operation. Then the tire 10 is placed over the rim 12 to seat the resilient ring 18 in the recess 26 of the flange 20, the tire 10 and the rim 12 being so oriented angularly as to permit the valve stem 46 to extend through a valve stem opening 48 provided in the rim 12. Then the retaining ring 30 is placed over the end of the rim 12 and pushed inwardly therealong past the rim recess 12' an amount sufficient to leave the space radially outwardly therefrom free to accommodate manipulation of the lock ring 36 into its place of seating in that recess 12'.

Figure 3:
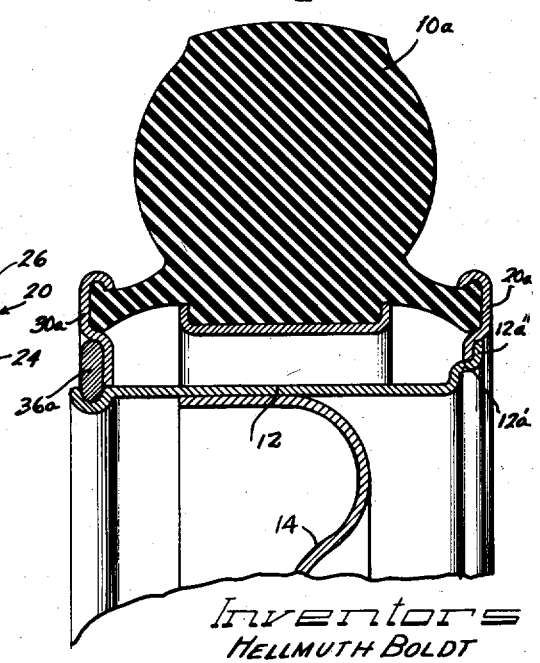
Figure 3 is a view similar to Fig. 2, but showing another preferred embodiment.

The rings 16, 18 may be attached to the wheel, to the rim 12 in the embodiments shown, by either vulcanization or by clamping. Fig. 3, which shows a solid tire 10a, illustrates an embodiment in which the elastic rings 16, 18 projecting from the tire 10a are vulcanized to a pair of metal retainer rings 20a and 30a. The retainer ring 30a as shown corresponds with the ring 30 of the embodiment of Fig. 2, and is held in place by a lock ring 36a corresponding to the lock ring 36. The retainer ring 20a may be generally symmetrical with respect to the ring 30a, except that the ring 20a is of a slightly larger inner diameter to permit it to more freely slide clear across the rim 12 during assembly. The rim 12, at its end with which the retainer ring 20a is associated, is provided with an outwardly offset portion 12a' of a diameter sufficient to hold the retainer ring 20a concentric with respect to the rim 12. The extreme end of the offset portion 12a' is turned outwardly as indicated at 12a'' to provide a limit flange limiting movement of the retainer ring 20a outwardly along the rim 12.

It should be noted that the outer surface 52 of each of the rings 16, 18 is desirably provided at an angle to the general extent of the rings 16, 18, to give greater bearing and greater lateral support to the tire. Moreover, it should be noted that the interrelationship of the parts is not necessarily such as to provide that the elastic rings 16, 18 be normally under no stress. We have found that an initial compression, for example, of the rings 16, 18 offers some advantages in operational characteristics.

A wheel constructed according to the present invention provides a novel means for resiliently supporting a tire from a wheel rim with the resilient rings 16, 18 flexing to permit relative movement of the tire 10 and rim 12 to absorb road shocks. Our construction also achieves a high degree of lateral stability, without the use of sliding and supporting disks. A wheel so constructed possesses desirable characteristics of shock-absorption by an economical and simplified construction and assembly, providing at low cost a smooth riding characteristic of the vehicle

We claim as our invention:

1. A resilient wheel comprising a tire having a hollow providing an air chamber, a circumferentially extending wheel rim, two resilient rings for connecting said tire to said rim, said rings each being integral with the tire and of a generally truncated cone configuration extending axially outward and radially inward from opposite side walls of said tire to the wheel rim, said integral rings each extending from a tire side wall radially inwardly of the maximum diameter of the tire adjacent the beads and being connected to the rim along its circumferential extent, said rings extending axially away from the axially outer limits of said tire and said air chamber, and said rings having a greater width along the slant height of said cone than their thickness measured generally radially of the cone.

2. The combination of claim 1 including a retaining flange carried at one side of the said rim and adapted to support the axially outer end of one of said resilient rings, a retaining ring separable from said rim but carried thereon at the other side thereof with respect to said retaining flange, said retaining ring adapted to support the axially outer end of the other of said resilient rings, each of said resilient rings being vulcanized to its associated retaining flange and ring respectively, there being formed in said rim outwardly of said retaining ring a circumferentially extending recess, and a lock ring adapted to seat in said recess and adapted to abut against said retaining ring to secure the same against outward movement.

3. A resilient wheel as in claim 1 including a central supporting band firmly engaging said tire at its inner diameter, and the relationship between said band and said rim connections of said resilient rings being such as to prestress said resilient rings in the direction of the slant height of each cone configuration.

References Cited in the file of this patent

UNITED STATES PATENTS

| 2,614,603 | Howley | Oct. 21, 1952 |

FOREIGN PATENTS

| 538,599 | France | Mar. 21, 1922 |
| 319,007 | Great Britain | 1931 |
| 580,395 | Great Britain | Sept. 5, 1946 |